Patented May 26, 1953

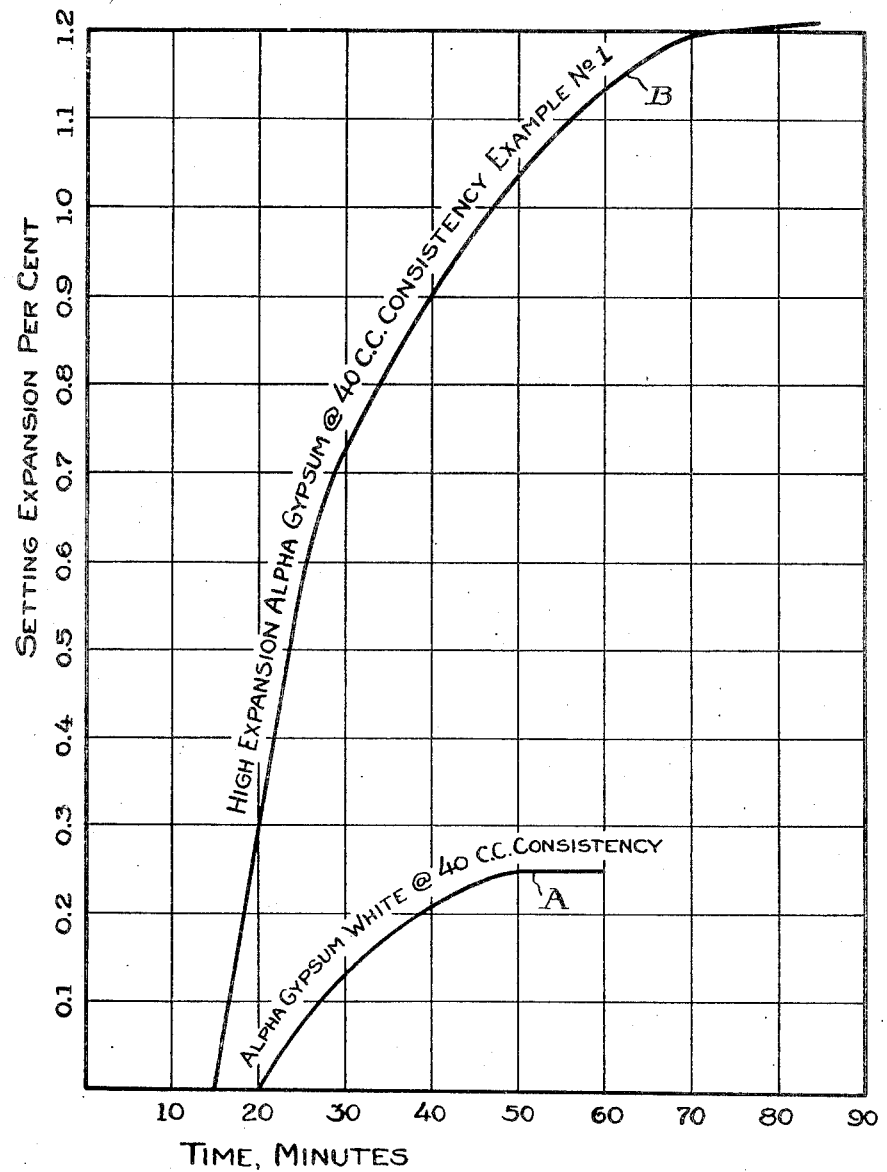

2,639,478

UNITED STATES PATENT OFFICE 2,639,478

PROCESS OF PREPARING PATTERNS

Brainard W. Nies, Crystal Lake, and Edward W. Duffy, Chicago, Ill., assignors to United States Gypsum Company, Chicago, Ill., a corporation of Illinois Application December 16, 1949, Serial No. 133,422

4 Claims. (Cl. 22—195)

This invention is a continuation in part of S. N. 617,198 now Patent No. 2,494,403, and relates to a plaster composition characterized by its ability to set to a hard dense mass when mixed with water accompanied by a marked and controllable increase in volume during hydration and after it has reached its apparent final set. This invention further relates to the utilization of this composition in the casting of fluid materials which can be shaped in molds to a desired solid form.

It is well known that plaster of Paris, when mixed with water and permitted to set, will increase slightly in volume. Advantage is taken of this property of plaster of increasing slightly in volume during setting to obtain fine detail replicas of various objects. Plaster of Paris when mixed with water to a pouring consistency, will expand lineally from about 0.15% to 0.20%. Alpha gypsum, which is a special type of calcined gypsum prepared by the calcination of gypsum with steam as described in U. S. Patent 1,901,051, will expand when cast at normal consistency from about 0.25 to 0.30% lineally. Somewhat higher expansion can be obtained by mixing calcined gypsum at a very thick or heavy consistency. Expansions as high as 0.30% for ordinary calcined gypsum and as high as 0.40% for alpha gypsum have been obtained under the most favorable conditions. Until the discovery forming the subject of this invention, which will be subsequently completely disclosed, no practical means of obtaining substantial additional increase in expanson had been found in spite of the fact that such a product, when obtained, would have valuable commercial uses.

It is therefore an object of this invention to provide a plaster composition which when mixed with water will give a cast possessing sufficient strength and hardness to withstand handling and characterized by high and controllable setting expansion.

It is also an object of this invention to provide a plaster composition which has a controllable setting time of practical commercial utility and possessing the property of high and controllable setting expansion.

It is a further object of this invention to provide a plaster composition which when mixed with water and set will expand to such a degree that it will compensate for the shrinkage of metals either cast within the composition employed as a mold or in a mold formed by a pattern cast from the new composition.

It is a further object of this invention to disclose a process of producing a pattern formed to give the exact size of the final desired cast item; the pattern being produced from a composition which develops sufficient expansion during setting to compensate for the shrinkage of molten material cast in a mold formed from the pattern.

It is also a further object of this invention to disclose a process of producing a mold from a composition which develops sufficient expansion during setting to compensate for the shrinkage of molten material cast therein.

A still further object of this invention is to provide a process involving the casting of molten material into a calcined mold formed from a composition which automatically expands during setting sufficiently to compensate for shrinkage of material cast therein.

Various other objects of this invention will readily occur to those skilled in the art of which this is a part.

We have discovered that the addition of finely ground animal glue to plaster markedly increases expansion of the plaster during setting. However, for practical purposes the introduction of glue into the plaster retards the setting time so much that it has questionable industrial application. Hence, it is a part of this invention to overcome this increased setting time caused by the addition of glue, by the use of suitable accelerators thereby giving the controlled and quicker setting time needed for commercial utility. Not all accelerators can be used for this purpose as they tend to neutralize the setting expansion properties imparted to the cast by the glue. It has been discovered that the best accelerator is finely ground gypsum sometimes known as terra alba or finely ground $CaSO_4.2H_2O$. This, however, is insufficient alone for most purposes as an accelerator and therefore must be fortified by one of greater strength. Aluminum sulphate has been found to be the best accelerator which can be successfully used in combination with finely ground gypsum to give the necessary increase in control of set along with the maximum setting expansion. Thus when finely ground animal glue, finely ground gypsum, and aluminum sulphate are incorporated with alpha gypsum, in a manner which will be clearly set forth in the forthcoming examples, mixed with water, and permitted to set, the setting expansion will be outstandingly greater than heretofore obtained for gypsum calcined in any manner whatsoever.

Throughout the description of this invention

"normal consistency" is defined as that amount of water in cubic centimeters or grams which when mixed with 100 grams of dry calcined gypsum will produce a mix of such consistency that it will just pour from a cup. Thus the use of the word "consistency" is an expression of the mixing water to solid ratio and is the same as percentage water based on weight of calcined gypsum.

The following examples of preferred embodiments of this invention are given for the purpose of illustrating means by which the essence of this invention may be carried out. It is not intended to limit the scope of this invention thereto for obviously other formulations and uses of this invention will readily occur to those skilled in the art in which this invention is a part and still not depart from the scope of this invention.

PREPARATION OF PATTERNS

Example 1

Composition:
- Alpha gypsum _____ 1950 parts by weight
- Finely ground cold water soluble animal glue _____ 20 parts by weight
- Aluminum sulphate __ 7½ parts by weight
- Terra alba or finely ground gypsum ____ 20 parts by weight Physical properties:
- Normal consistency __ 45 cc.
- Time of set _____ 28 min.
- Setting expansion ____ 1.2 percent at 40 cc.

Patterns of complex shape may be formed for the preparation of molds for casting molten material to the exact size of a predetermined model by using for their formation a plaster designed to expand during set to an amount equal to the casting shrinkage experienced during cooling or hardening of the finished molten material. The above composition, given as Example 1, has proven successful in the production of patterns cast to model size, designed for use in sand molds into which is cast Kirksite A, a trade name for a high zinc alloy die casting metal. This composition possesses proper setting time for normal use and develops a 1.2% setting expansion when cast at a ratio of 40 parts water to every 100 parts of dry powder. Thus by using the above material to cast patterns from a model the high set expansion purposely makes the pattern oversize in order to compensate for the metal shrinkage. Thus large complex shape patterns can readily be made which will give an accurate reproduction of the model from Kirksite A. Other metals may also be similarly cast merely by an adjustment in the formula to give an expansion during set which will compensate for the shrinkage of the metal used. Thus the expensive and laborious practise of making patterns out of wood or the like oversize to compensate for metal shrinkage is done away with by this invention. It has often been found difficult and in fact in some cases commercially impossible to accurately prepare a pattern of complex shape which will compensate in all directions for the volume shrinkage of metals during cooling. Thus by the use of a plaster composition, the setting expansion of which is the same as that of the metal shrinkage during cooling, an accurate reproduction is obtained without the exercise of considerable skill and calculations as formerly required.

If a set expansion of only 0.65% for a 40 cc. consistency is desired, a much stronger cast can be obtained by using the following example.

Example 2

Composition:
- Alpha gypsum _____ 1975 parts by weight
- Finely ground cold water soluble animal glue _____ 10 parts by weight
- Aluminum sulphate __ 5 parts by weight
- Terra alba or finely ground gypsum ___ 12 parts by weight Physical properties:
- Normal consistency __ 44 cc.
- Time of set _____ 25 min.
- Setting expansion __ 0.65 percent at 40 cc.

Plaster composition as given in Example 2 will be about 50% greater in strength then that of Example 1.

There are two methods by which a pattern can be prepared from a particular model using this invention. A female, sectional mold can be made of the model using the high setting expansion plaster composition and this mold can be used to form a pattern from a setting material, preferably plaster of low set expansion, though Portland cement or other fluid hardenable materials can be used. If there is considerable expansion when the pattern is cast using the high setting expansion plaster pattern mold then an adjustment for the added expansion must be made when the pattern mold is formed.

If it is desired to prepare a pattern of very high expansion then it may be desirable to use high set expansion plaster in preparing the pattern also. Thus by using high set expansion plaster on a series of pattern molds and patterns the expansion will be accumulative and the ultimate pattern will thus have a very great expansion over the original model. This is especially desirable in molding plastics which may have high shrinkage.

The other, or second, method by which a pattern can be made is to mix a composition such as illustrated by either Example 1 or 2, with water at the mixing water ratio found necessary to give the desired degree of final setting expansion. This may be within a range of 30 to 50 ccs. consistency. It has usually been found that mixes made at less than the minimum consistency are too stiff to handle in a practical manner. The normal technique commonly employed in the preparation of plaster mixes is used. The slurry is then cast into molds formed from the model. These molds can be of the rigid type such as made from plaster, metal, plastics etc., or of the flexible type such as made from glue, vinyl chloride sold under the trade name of Korogel, rubber etc. The flexible molds are ideal pattern molds if satisfactory dimensional accuracy can be obtained with them as they permit free expansion during setting to occur. When molds of the rigid type are used it has been found desirable to employ them as sectional molds consisting of several pieces to permit free expansion of the high expansion plaster to occur, otherwise, the pattern should be removed from the mold as soon as it has hardened sufficiently and placed where expansion can take place freely in all directions.

Completion of a maximum degree of setting expansion is obtained within 24 hours after the casting of the composition, though substantially the greater portion of the expansion takes place within the first two hours. After the final expansion has taken place, the set and hardened pieces may then be employed directly as standard patterns. For very close accuracy and to do away with tests to determine the proper formula for the expansion needed, it has been found desirable to use a formula which overexpands and to watch the expansion and as soon as it reaches the desired degree the pattern is immediately used to form the casting mold.

It must be pointed out that the first method is not quite as accurate as the second in producing uniformly oversize pattern reproductions of an original model. However it can be used with reasonable skill to obtain a fairly good reproduction of the model.

Molten Kirksite A metal cast into a sand mold shaped by patterns formed by the above methods shrink during cooling to the exact size of the original model from which the pattern was formed. The method of preparing molds from the pattern is well known in the foundry art and need not be described here. It is possible to utilize the product of this invention, following this invention, to accurately reproduce patterns from a master pattern which in itself may be unsuitable for regular foundry practise.

If the first but less accurate method described above is used, such as forming oversized molds from high setting expansion plaster for use later in casting oversized patterns, harder or stronger pattern forming materials such as high strength gypsum cement, casting resins etc. can be used. When this method is employed it can be carried out such as by encasing a model of the desired size in a dam, and pouring an aqueous slurry of the high expansion plaster within the dam around the model. The setting expansion increases the size of the mold so formed substantially uniformly in all directions. Thus, the pattern later cast into this pattern mold will be substantially of the correct degree of oversize in all dimensions. It is advisable to pour the entire mold at one time rather than one section at a time and to depend upon parting means for obtaining the various sections.

DENTAL INVESTMENT PLASTER

*Example 3*

Composition:
    Alpha gypsum_____ 1000 parts by weight
    Fine silica_____ 1000 parts by weight
    Finely ground cold water soluble animal glue_____ 40 parts by weight
    Aluminum sulphate_____ 20 parts by weight
    Terra alba or finely ground gypsum_____ 15 parts by weight Physical Properties:
    Normal consistency_____ 40 cc.
    Time of set_____ 13 min.
    Setting expansion_____ 1.65 percent at 28 cc. consistency Casting shrinkage of about 1.25% occurs during cooling of noble metal dental inlays, dentures, etc. as cast into "Dental investment" molds. To obtain dimensional accuracy in finished castings, it is necessary to depend upon compensating thermal expansion of investment molds during "burn out," employ "wax pattern expanding" techniques prior to casting, or the use of other techniques which are not reliable and which are subject to error in the hands of inexperienced or careless technicians. If a plaster investment were available which expands during setting to 1.25% of the original size of the wax pattern, the resulting mold cavity is thereby uniformly increased in all dimensions by the exact amount necessary to compensate for the subsequent shrinkage of metals cast therein and cooled. Thus accurate and well fitting dentures are obtained. The above Example 3 will give such results. The composition is mixed with water to the desired consistency and cast around the wax impression of the cavity. After the cast has set the wax is melted and removed from the sprue, formed as part of the mold during its preparation. The composition disclosed contains silica as an added refractory aggregate which permits the set composition to be calcined at temperatures between 1200° F. and 2000° F. after it has been set and expanded. This not only removes the wax or the like but also conditions the mold for introducing the molten metal. In compositions of this type in which a high melting point metal is to be cast, finely ground silica or other forms of $SiO_2$, alumina, kyanite, sillimanite, calcined refractory grog, pyrophyllite or other finely ground refractory aggregate must be added to prevent destruction of the set product during the calcination cycle required to put the set mold into shape for receiving the molten metal.

MOLDS

It is possible to use a plaster composition made in accordance with this invention, such as shown in Examples 1 and 2, as a mold for the casting of low melting point metals and to use the high set expansion characteristics to compensate for the shrinkage of the metal during cooling in a manner similar to that disclosed for the preparation of a pattern. In carrying out this operation, the high set expansion plaster can be cast in regular foundry flasks, or in sections as desired, around a model of the object to be reproduced. The model is then removed and the parts of the mold are then reassembled. The necessary details well known to the foundry art of casting metals are incorporated into the mold such as sprues and gates, runner bars, guides, vents, parting material, addition of cores etc. In order to prevent distortion, it is advisable to form all the sections such as the cope and drag at one pouring of the casting plaster or at least in such a way that the setting of one section will not cause a distortion of the next. If rigid flasks are employed for containing the plaster, it is advisable to provide flexible lining strips of asbestos paper, rubber, or the like as a lining between flask sides and plaster to permit free outward expansion of the plaster during set, thus preventing distortions. However, the usual method of forming molds from plaster as used in the foundry art can be followed if distortion is not important.

It is also possible to use our composition in practising the lost wax technique for producing large castings from low melting point alloys. A wax model is made of the article to be cast. A mold of high expansion plaster is formed around this model with a sprue for removing the wax or other material which can be removed by heat and as an entrance gate for the metal. After conditioning the cast with heat the metal is then poured through this sprue or another if so provided into the cavity left by the destroyed model. Here again a faithful dimensionally accurate reproduction of the model will be obtained because the shrinkage of the metal is compensated for by the expansion of the plaster.

Since all molten or liquid materials which can be cast do not have the same shrinkage coefficient it is necessary to tailor the plaster formula to obtain the desired degree of expansion to properly compensate for the variable shrinkage. Obviously it would be impossible to give examples of all metals and plastic materials which can be cast in this manner. Sufficient information will be found in this description of this invention to enable anyone skilled in the art in which this invention is a part to make any adjustments in the formula required to give the proper expansion without the exercise of inventive skill.

The following table lists practical limits of compositions which can be used in applying the principle of this invention to a great number of varied uses.

*Table 1*

Composition limits:

| | Parts by weight |
|---|---|
| Alpha gypsum | 2000 |
| Finely ground cold water soluble animal glue | 5–40 |
| Aluminum sulphate | 2–20 |
| Finely ground $CaSO_4 \cdot 2H_2O$ | 5–30 |

The addition of glue, preferably powdered, water soluble, animal glue, commonly known as cold water glue in amounts ranging from 5 to 40 pounds per ton is essential in obtaining the desired increase in setting expansion. Use of glue in excess of approximately 2 percent results in little further increase in expansion, lowers strength, and lengthens setting time so excessively that abnormally high amounts of accelerators are required to compensate for the retarding action of the glue.

It is important that a cold water soluble animal glue be used and that it be ground. In the above examples Armour and Company's No. 2 cold water soluble animal glue of a fineness so that all will pass a 40 mesh screen and having a "jell test" of 115 minutes was used and has been found very satisfactory; obviously other sources and types of cold water soluble animal glue can be used with varying results. If other types of glue are used then a variation may be required in the formula. It is important that the glue be stored in a cool dry place and should not be kept longer than three months. By "finely ground cold water soluble animal glue" is meant that particular type of animal glue, whether made from bones or hides, which is so formed that it readily becomes soluble in cold water.

The use of the right type of accelerator to overcome the retardative effect of the glue is also an important part of this invention. Finely ground gypsum alone has practically no effect upon the set expansion but by itself has not sufficient accelerating power to overcome the retardation of the glue. Aluminum sulphate in combination with finely ground gypsum, with the aluminum sulphate maintained at the very minimum, provides a highly satisfactory combination of accelerators, although copper sulphate can be substituted for aluminum sulphate with less effective results. Compositions possessing practical setting times within limits of five minutes to one hour require the above combination of accelerators for commercial success. Increasing the amount of aluminum sulphate used reduces the degree of setting expansion obtained during hydration of the material, therefore it is generally desirable in preparing a formula for a particular expansion to use a maximum amount of finely ground gypsum and a minimum amount of aluminum sulphate. The finely ground gypsum should be freshly and finely ground and of the accelerating type. Ordinarily, raw gypsum is used to prepare the material though finely ground, set calcined gypsum can be used for the purpose. Throughout the description of this invention, terra alba is intended to mean finely ground calcium sulphate dihydrate. The aluminum sulphate used in the above formulas is the commercial grade known as "paper makers alum" and contains a small quantity of impurities. Other types of aluminum sulphate can be used but obviously a variation must be made in the formula to give a comparable setting time. Throughout the description of this invention and in the claims the word aluminum sulphate implies that any soluble form of aluminum sulphate can be used as an equivalent.

In all of the above examples alpha gypsum is employed as it is the best type of hemihydrate for this purpose; its high strength, hardness and toughness is reflected in the finished product. Ordinary plaster of Paris or calcined gypsum may be substituted for alpha gypsum when a product of lower strength and lower setting expansion is adequate. Less glue is required with alpha gypsum to secure the same expansion, which also means less accelerator as well.

Other ingredients which do not interfere too greatly with the setting time and expansion can be added to give certain desirable properties to the cast. In Example 3, finely ground silica was added to improve the refractory properties of the set composition. Asbestos, vermiculite, and other refractory materials referred to above and preferably in a finely ground state can be incorporated into the composition when needed to bring out certain desirable properties.

The importance of glue in increasing the expansion of calcined gypsum casts is shown in the data contained in the following table:

*Table II*

EFFECT OF GLUE ON PROPERTIES

Basic composition:

| | Parts by weight |
|---|---|
| Alpha gypsum | 2000 |
| Aluminum sulphate | 10 |
| Terra alba or finely ground gypsum | 15 |

GLUE ADDED TO ABOVE

| Parts by wt. Powdered cold water soluble glue Armour No. 2 | Normal Consistency (cc.) | Time of Set (min.) | Percent Linear Setting Expansion (35 cc. consistency) |
|---|---|---|---|
| 0 | 42 | 5 | .248 |
| 5 | 44 | 13 | .460 |
| 10 | 44 | 20 | .70 |
| 20 | 45 | 29 | 1.20 |
| 30 | 47 | 36 | 1.00 |

From the above it is evident that an increase in the amount of glue used gives a corresponding increase in both the setting expansion and the time of set.

It has been discovered that a much greater setting expansion can be obtained if the glue is first dissolved in the gauging water before mixing. For example when 12.5 parts of Armour and Company No. 2 cold water glue are dissolved in 300 parts of distilled water and permitted to soak over night and this used to gauge a mixture consisting of alpha gypsum 1000 parts, terra alba 20 parts, alum 3 parts, the setting expansion was found to be 4.2%. This is about three times the expansion obtained when the glue is used as a powder as disclosed previously.

By adding the glue in solution a much less quantity is needed with improved results. Unfortunately it is not commercially expedient, in most cases to use glue in this form. However in the forthcoming claims whenever glue is mentioned it is to be understood that glue in solution is also within its scope.

In the accompanying drawing, Figure 1 illustrates by means of curves the rate of development of setting expansion in the composition as shown by Example 1 as compared with the setting of alpha gypsum alone, both cast at the same consistency or mixing water ratio. In Figure 1, curve A illustrates the rate of linear expansion in percent increase obtained using alpha gypsum alone and poured at a 40 cc. consistency while curve B illustrates the rate of linear expansion in percent increase with the high setting expansion plaster given in Example 1 also poured at a 40 cc. consistency and using the same type of alpha gypsum as for curve A. Additional expansion will take place beyond the time shown but very little expansion will be obtained after 24 hours, which usually is considered the ultimate setting expansion. A considerable amount of the expansion takes place after the apparent final set has been reached.

In general it will be found that when the same composition is used, the setting expansion is greatest when the amount of water used is reduced to a minimum. In other words, the lower the mixing water ratio, the greater the set expansion for the same composition. Thus when changes in setting expansion are needed they can be obtained by an adjustment in the mixing water ratio. If a higher expansion is required, the mixing water ratio can be lowered and conversely if a lower set expansion is required, the ratio can be raised. The expansion can be varied as much as .8% in this manner with a high setting expansion composition though the extremes will be either too thick or too thin for practical utility. An exact degree of set expansion may be obtained within a considerable range by a simple variation of the mixing water ratio used. It is very important where close expansion control is needed to keep the mixing water ratio constant once it has been established.

Patterns and molds can be made in the above manner for casting practically any type of metal which may shrink during cooling by a simple variation in the formulae disclosed to conform with the particular degree of shrinkage. This invention is also applicable to the use of centrifugal casting and need not be limited to the casting of metals alone for it can be applied to the casting of thermoplastic or thermosetting resins where the shrinkage is not too excessive. A mold can be prepared from a model using the following formula and by any of the procedures described above.

*Example 4*

| | Parts by weight |
|---|---|
| Alpha gypsum | 2000 |
| Powdered CaSO$_4$.2H$_2$O | 15 |
| Ground cold water animal glue Armour #2 | 20 |
| Finely ground copper sulphate | 10 |

The above mixture will have a normal consistency of about 41 cc. and an expansion of 1.11% at 35 cc. consistency.

A thermosetting resin in fluid condition is introduced into the dry mold and the cast and resin baked together until the resin has cured.

A suitable resin for this purpose is Catavar 101, a phenol formaldehyde resin made by the Catalin Corporation. The resin is heated to 175° F. to a fluid condition and poured into the plaster mold which should previously be lined with rubber latex or the like to prevent sticking. The filled mold is baked at 175° F. until the plastic has hardened, which is usually around 72 hours. Since plastics do not shrink the same as metals and since they are subject to a much greater variation in shrinkage relative to the shape as well as in degree, a faithful volumetric reproduction cannot usually be obtained so that some machining may be necessary. However, for a limited use and for certain products, and types of plastics some value can be obtained from the application of this invention to plastic molding.

While thermoplastic molding may also be carried out by this invention, more difficulty may be experienced because of the excessive heat and pressure required.

By way of summary this invention comprises the use of powdered water soluble animal glue with calcined gypsum, preferably alpha gypsum together with a combination of finely ground gypsum and preferably aluminum sulphate, though copper sulphate can be used, as accelerators to give set control to overcome the retarding action of the glue for the purpose of obtaining a controllable high set expansion plaster which has practical utility in the formation of molds, patterns, and the like for the casting of metals and other liquid materials which can be hardened in situ.

Although there has been disclosed a practical embodiment of this invention and specific examples, and uses which are given to insure a clear understanding of the essence of this invention, it is not the intention to be limited thereby for obviously many variations may be made by those skilled in the art and still be within the scope of this invention which is only limited by the forthcoming claims.

It is claimed:

1. The process of casting a substantially dimensionally accurate reproduction of an object from a hardenable fluid material which shrinks upon hardening, comprising forming a mold having a casting cavity conforming to the shape of the object to be reproduced, pouring an aqueous slurry of a calcined gypsum plaster having a setting expansion of at least about 0.65% into said cavity, permitting said plaster to expand upon setting to form a pattern, forming a mold from said pattern, and casting a hardenable fluid in said mold, the increase in size of said pattern over said object being substantially the same as the shrinkage of said fluid during hardening.

2. The process of claim 1 in which said first mold is formed of a flexible material.

3. The process of preparing a pattern for casting a substantially dimensionally accurate reproduction of an object with a fluid material which shrinks upon hardening, comprising forming a mold from such object having a casting cavity conforming to the shape of the object, pouring into the cavity an aqueous slurry of a calcined gypsum plaster having a setting expansion of at least about 0.65%, permitting said plaster to expand upon setting to form a pattern, the increase in size of said pattern over said object being substantially the same as the hardening shrinkage of the fluid material to be cast, forming a mold from said pattern and casting the fluid material.

4. The process of claim 3 in which the first mentioned mold is formed of a flexible material.

BRAINARD W. NIES.
EDWARD W. DUFFY.

References Cited in the file of this patent

UNITED STATES PATENTS

| Number | Name | Date |
|---|---|---|
| 910,166 | Bonvillain | Jan. 19, 1909 |
| 980,888 | Nygren | Jan. 3, 1911 |
| 1,508,800 | Mattice | Sept. 16, 1924 |
| 1,901,054 | Dailey | Mar. 14, 1933 |
| 2,078,199 | King | Apr. 20, 1937 |
| 2,078,200 | King | Apr. 20, 1937 |
| 2,118,468 | Jungersen | May 24, 1938 |
| 2,391,855 | Bean | Dec. 25, 1945 |
| 2,396,195 | Pattison | Mar. 5, 1946 |
| 2,494,403 | Nies et al. | Jan. 10, 1950 |

FOREIGN PATENTS

| Number | Country | Date |
|---|---|---|
| 198,973 | Canada | Apr. 6, 1920 |